United States Patent [19]
Carpenter

[11] Patent Number: 4,961,603
[45] Date of Patent: Oct. 9, 1990

[54] VEHICLE BUMPER SYSTEM

[75] Inventor: Ronald A. Carpenter, Dearborn, Mich.

[73] Assignee: Ford Motor Company, Dearborn, Mich.

[21] Appl. No.: 452,490

[22] Filed: Dec. 19, 1989

[51] Int. Cl.$^5$ ............................................. B60R 19/04
[52] U.S. Cl. .................................. 293/102; 293/120; 293/154; 293/155
[58] Field of Search ............... 293/102, 120, 138, 154, 293/155

[56] References Cited

U.S. PATENT DOCUMENTS

| | | | |
|---|---|---|---|
| 1,485,042 | 2/1924 | Lyon | 293/146 |
| 1,626,347 | 4/1927 | Lyon | 293/146 |
| 2,030,978 | 2/1936 | Fortier et al. | 296/155 |
| 3,999,793 | 12/1976 | Roubinet | 293/127 |
| 4,391,464 | 7/1983 | Masotti et al. | 293/120 |
| 4,440,429 | 4/1984 | Eyb | 296/155 |
| 4,533,166 | 6/1985 | Stokes | 293/120 |
| 4,807,915 | 2/1989 | Shyi | 293/132 |

Primary Examiner—Robert R. Song
Attorney, Agent, or Firm—Roger L. May; Daniel M. Stock

[57] ABSTRACT

A vehicle bumper system for a vehicle, having a vehicle body and a pair of longitudinally extending load bearing members, includes a bumper member extending between the pair of longitudinally extending load bearing members. A tension means extends between the pair of longitudinally extending load bearing members for preventing the application of outwardly directed lateral forces to the load bearing members. The curved bumper member and the tension means are directly, pivotally connected to the pair of longitudinally extending load bearing members at the same locations on the load bearing members, such that an impact force applied to the bumper member does not result in outwardly directed lateral forces being applied to the load bearing members, or such lateral forces are minimized. The curved bumper member and the tension means may be formed as a single unit or, alternatively, may be separate elements. The bumper member and the tension means may be made of metal or of a structural composite material.

17 Claims, 3 Drawing Sheets

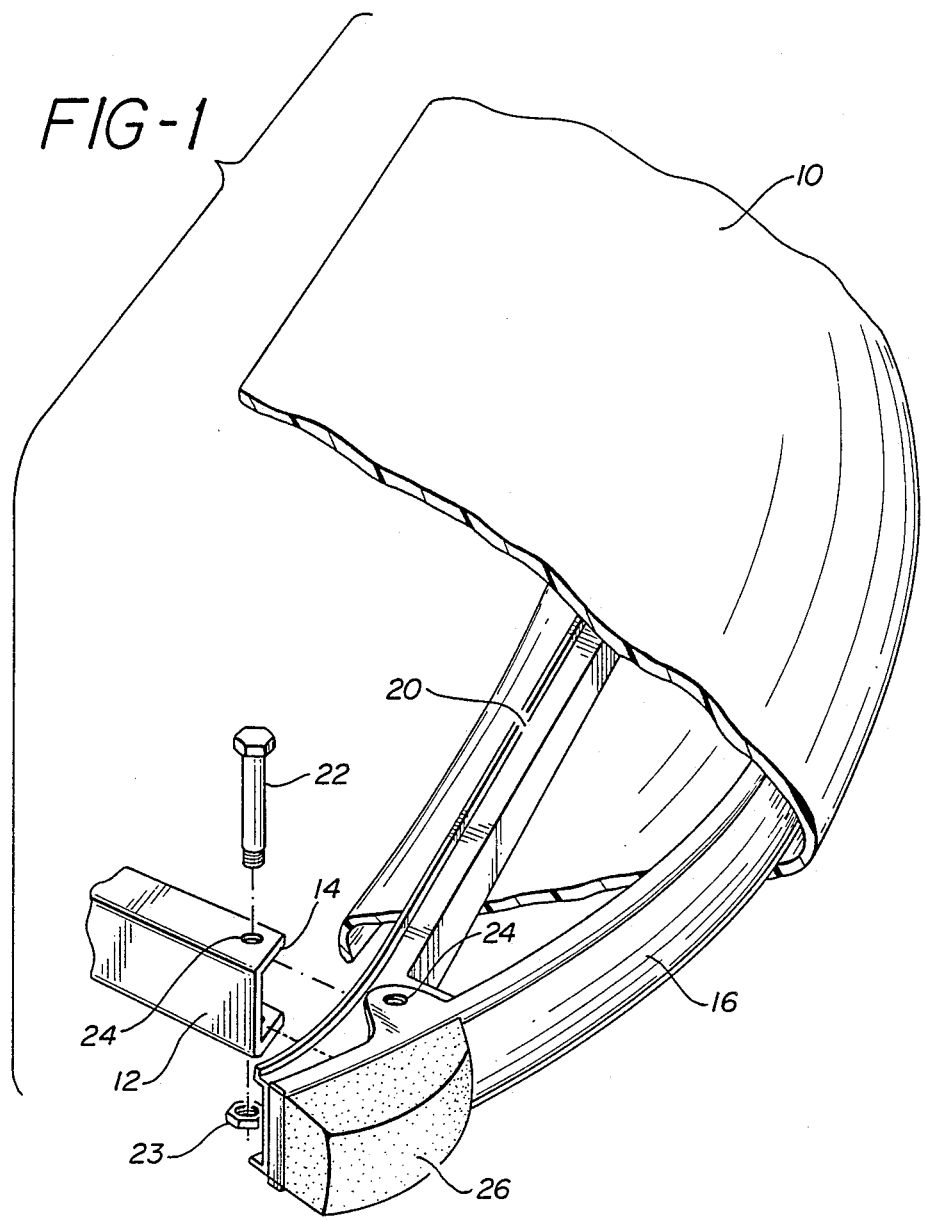

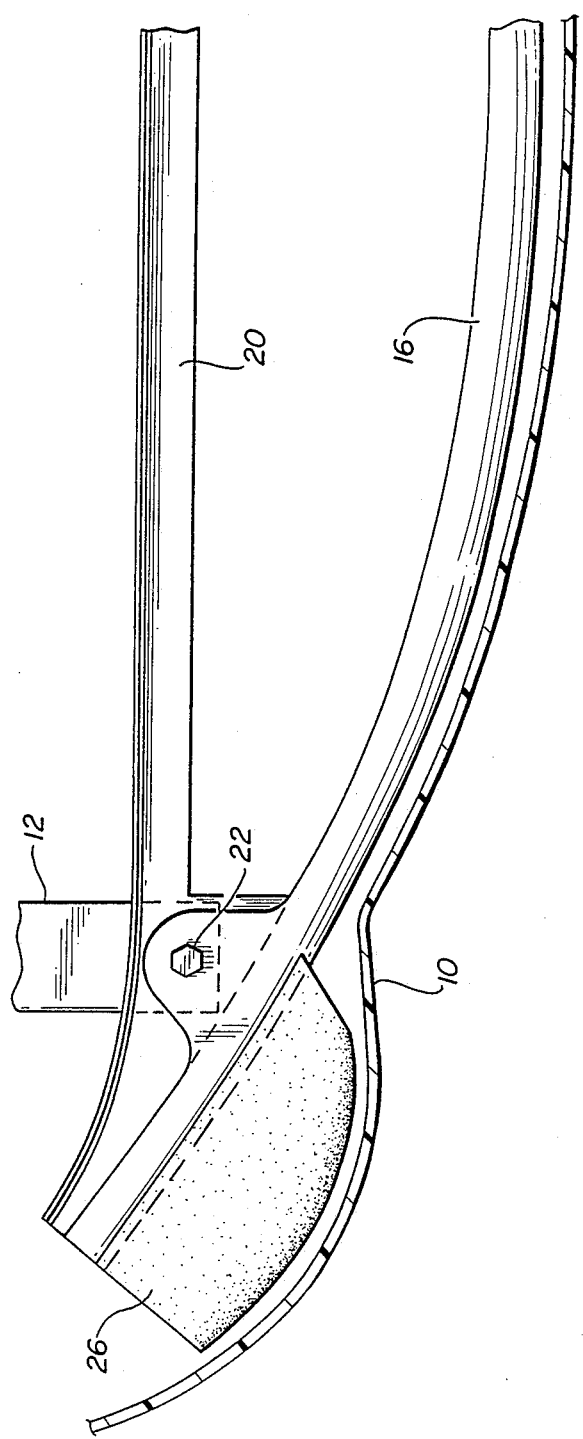

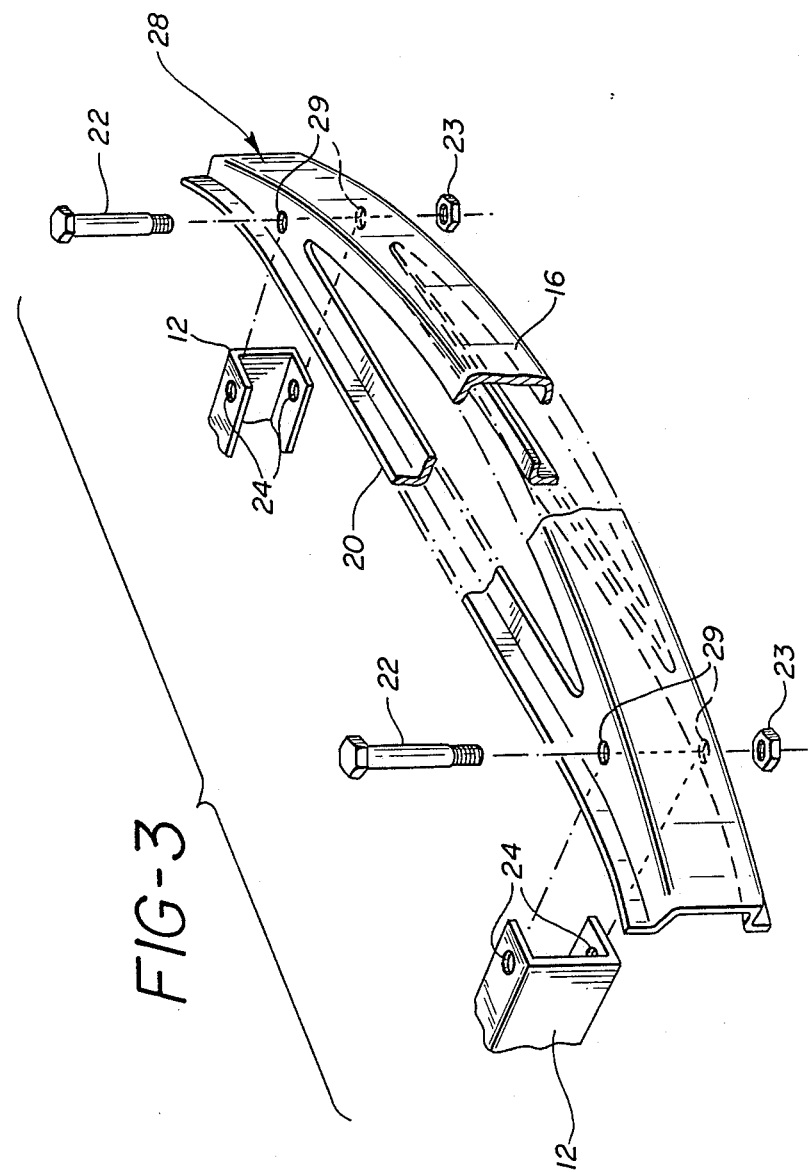

VEHICLE BUMPER SYSTEM

BACKGROUND OF THE INVENTION

The present invention relates to a bumper system for a vehicle and, more particularly, to such a bumper system in which a curved vehicle bumper member is connected directly to longitudinally extending load bearing members which are part of the vehicle. This bumper system may be utilized with motor vehicles of the type having a separate frame or with motor vehicles having unibody construction.

Bumpers are used on motor vehicles to absorb low level impact forces and to limit the amount of damage sustained to the vehicle body during high level impacts. It is desired that permanent damage caused by a crash be confined, to the degree possible, to the bumper structure itself. This facilitates repair, since only the damaged bumper must be replaced. With impacts of any level, it is desired that the energy of impact be absorbed or dissipated without permanently deforming the main structure of the vehicle, including the parallel, laterally spaced pair of load bearing members which extend longitudinally to the front and to the rear of the vehicle, and to which a vehicle bumper system may commonly secured.

A number of prior art bumper systems have included a spring support arrangement for securing a bumper to the longitudinally extending load bearing members of a vehicle. One such system is shown in U.S. Pat. No. 1,485,042, issued Feb. 26, 1924, to Lyon. The '042 Lyon patent discloses a bumper structure, including a generally straight bumper member, which attaches to the ends of the frame rails of an automobile, and which incorporates a straight member bridging the points of attachment.

U.S. Pat. No. 1,626,347, issued Apr. 26, 1927, to Lyon, discloses a curved bumper in conjunction with a member extending across the vehicle frame and having a lateral "bracing action" on the vehicle frame at the points of attachment. The '347 Lyon patent, like the '042 Lyon patent, relates to a bumper system in which the bumper is attached to the vehicle frame through an intermediate spring support structure. Depending upon the relative stiffness of the components of this bumper and further depending upon the nature of the impact force to the bumper, it is possible that the load bearing rails could be subjected, by an impact force applied to the bumper, to inward or outward lateral forces, no lateral forces, or lateral forces directed in the same direction.

With the bumper systems disclosed in the Lyon patents, a spring mounting arrangement is provided to attach the bumper to the vehicle frame. One problem with such a spring mounting arrangement is that it results in only relatively low level forces being applied to the bumper system during the initial movement of the bumper at impact. Since very little energy is absorbed during this initial displacement of the bumper, and since a fixed amount of energy must be absorbed in any given collision, a substantial amount of movement of the bumper must be permitted. It will be appreciated that this results in a vehicle which is longer than would otherwise be necessary in order to permit the rather large deflection of the bumper system.

Optimally, a bumper system should be designed so that the reaction force applied to the bumper during an impact increases quickly to a maximum level as the bumper is displaced, and then remains relatively constant when as the bumper undergoes further displacement. This results in the maximum amount of energy being absorbed for a given amount of bumper displacement, with the reaction force experienced by the bumper and load bearing members to which the bumper is attached being limited to a desired level.

It is seen, therefore, that there is a need for a bumper system in which the reaction force level experienced at impact by a bumper system increases rapidly to a predetermined level and thereafter remains generally constant, and in which the likelihood of damage to the vehicle is reduced.

SUMMARY OF THE INVENTION

These needs are met by a vehicle bumper system according to the present invention for protecting a vehicle having a pair of longitudinally extending load bearing members The vehicle bumper system includes a curved bumper member extending between the ends of the pair of longitudinally extending load bearing members, and a tension means extending between the ends of the pair of longitudinally extending load bearing members. The tension means prevents the application of outwardly directed lateral forces to the load bearing members. The bumper system further includes means for directly, pivotally connecting the curved bumper member and the tension means to the ends of the pair of longitudinally extending load bearing members at the same locations on the load bearing members, such that an impact force applied to the bumper member does not result in outwardly directed lateral forces being applied to the load bearing members, or such lateral forces are minimized.

The curved bumper member and the tension means may be formed as a single unit. Alternatively, the curved bumper member and the tension means may be formed as separate elements, each being connected separately to the ends of the pair of longitudinally extending load bearing members.

The means for connecting the curved bumper member and the tension means directly to the pair of longitudinally extending load bearing members at the same locations on the load bearing members may comprise a pair of connector members, each of which extends through one or more openings in the single unit, and in one of the pair of longitudinally extending load bearing members.

The bumper member and the tension means may be formed of metal. Alternatively, the bumper member and the tension means may be formed of a structural composite material.

The means for pivotally connecting the curved bumper member and the tension means to the pair of longitudinally extending load bearing members at the same locations on the ends of the load bearing members may comprise a pair of connector members, each of which extends through openings in the curved bumper member, in the tension means, and in one of the pair of longitudinally extending load bearing members.

The bumper member may extend laterally outward beyond the longitudinally extending load bearing members. Energy absorbing means may be mounted on the bumper member adjacent the ends thereof, laterally outward of the longitudinally extending load bearing members, for absorbing the energy of an impact to the vehicle body. The energy absorbing means may comprise a pair of blocks of energy absorbing foam material attached to the bumper member.

Accordingly, it is an object of the present invention to provide a vehicle bumper system in which the vehicle is more effectively protected; to provide such a vehicle bumper system in which a curved bumper is connected directly to the vehicle longitudinally extending load bearing members but in which the tendency of these load bearing members to spread apart on impact to the bumper member is reduced; and to provide such vehicle bumper system in which is simple in construction and in the manner of its manufacture.

Other objects and advantages of the invention will be apparent from the following description, the accompanying drawings and the appended claims.

BRIEF DESCRIPTION OF THE DRAWINGS

FIG. 1 is an exploded perspective view of a first embodiment of the bumper system of the present invention, with portions broken away, and with part of the vehicle body removed;

FIG. 2 is a top view of the left portion of the bumper system of FIG. 1, with the vehicle body broken away and in section; and FIG. 3 is an exploded perspective view of a second embodiment of the bumper system of the present invention, with portions broken away or in phantom lines.

DETAILED DESCRIPTION OF THE PREFERRED EMBODIMENTS

The present invention relates to an improved vehicle bumper system, a first embodiment of which is illustrated in FIGS. 1 and 2. The vehicle bumper system is intended to protect a vehicle of the type having a vehicle body 10, and a pair of longitudinally extending load bearing members 12 (only one of which is illustrated in FIGS. 1 and 2) terminating at their forward ends 14. Although the members 12 are illustrated as terminating at their forward ends within the vehicle body 10, it should be understood that the bumper system may also be utilized with a vehicle in which the members 12 extend through the body 10. It will further be appreciated that the bumper system of the present invention may be utilized at the rear of the vehicle, as well. The forward portion of the vehicle body 10 illustrated in FIGS. 1 and 2 may be made of metal, such as for example steel, but is preferably constructed of a molded, resilient plastic material.

The bumper system includes a bumper member 16 extending between the pair of longitudinally extending load bearing members 12. The bumper system additionally has a tension means, including brace element 20 extending between the pair of longitudinally extending load bearing members 12 within the vehicle body, for reducing the application of outwardly directed lateral forces to the load bearing members 12. The bumper member 16 and the brace element 20 may be made of a metal, such as for example steel or, alternatively, they may be made of a structural composite material, such as for example a urethane foam core surrounded by a layer of fiberglass reinforced plastic.

Finally, the bumper system includes a means, such as for example bolts 22 (only one of which is illustrated in FIGS. 1 and 2), for connecting the curved bumper member 16 and the brace element 20 directly to the pair of longitudinally extending load bearing members 12 at the same locations on the load bearing members within the body. The bolts 22 may be secured at their lower ends by means of lock nuts 23, cotter pins, or other the like. It is preferred that the bolts 22 pivotally connect the member 16 and the element 20 to the members 12.

The brace element 20 performs an important function in cooperation with the curved bumper member 16. If a curved bumper were to be attached directly to the load bearing members 12 without the brace element 20 extending therebetween, an impact force applied to the bumper member 16 would tend to straighten the curved bumper, forcing the load bearing members 12 apart. The application of such outwardly directed lateral forces to the load bearing members could otherwise bend the load bearing members 12, causing significant damage to the frame of the vehicle. Such outwardly directed lateral forces are at least partially absorbed by the brace element 20, however, precluding or limiting such bending of the load bearing members 12. The pivotal connection provided by the bolts 22 precludes the application of bending moments to the members 12 by the element 20 or the bumper member 16 during an impact.

In the embodiment of FIGS. 1 and 2, the curved bumper member 16 and the brace element 20 are formed as separate elements, each being connected separately to the pair of longitudinally extending load bearing members 12. In this embodiment, the bolts 22 each extend through openings 24 in the curved bumper member 16, in the brace element 20, and in one of the pair of longitudinally extending load bearing members 12. It will be appreciated that other, equivalent means, such as pins or the like, may be provided for connecting the bumper member 16 and the brace element 20 to the ends of the load bearing members 12.

The bumper member 16 extends laterally outward beyond the longitudinally extending load bearing members 12, but within the vehicle body 10. The vehicle bumper system may further comprise energy absorbing means, such as for example blocks 26 of energy absorbing foam material, mounted on the bumper member 16 adjacent the ends thereof, outwardly of the longitudinally extending load bearing members 12 and, in the embodiment shown in FIGS. 1 and 2, within the vehicle body 10, for absorbing the energy of an impact to the vehicle body 10, and cushioning the vehicle bumper system and the rest of the vehicle from the effects of this impact. An impact force of low level applied to this portion of the body 10 will not result in damage to the body 10 if the body is made of a resilient molded plastic material It will be appreciated, as stated previously, that the present invention is in no way limited to a vehicle design in which the bumper member 16 is positioned within the vehicle body. Rather, the invention will also find utility in vehicles having curved bumper member in which the bumper member is located partially or entirely outside of the vehicle body structure.

Reference is now made to FIG. 3 of the drawings, illustrating a second embodiment of the invention, in which elements corresponding to those in the first embodiment of FIGS. 1 and 2 have been designated with the same reference numerals. In the embodiment of FIG. 3, the curved bumper member 16 and the brace element 20 are formed as a single unit 28. As with the first embodiment of the invention, the unit 28 comprising bumper member 16 and the brace element 20 may be formed of metal or, alternatively, a structural composite material such as a foam material covered with a fiberglass reinforced layer. The means for connecting the curved bumper member 16 and the brace element 20 directly to the pair of longitudinally extending load bearing members 12 at the same locations on the load bearing members includes a pair of connector members, such as bolts 22, each of which extends through one or more openings 29 in the unit 28, and in one of the pair of longitudinally extending load bearing members 12.

The vehicle bumper system of the present invention provides a number of advantages over prior art bumper systems. It is considered highly desirable to provide a bumper system in which the impact bumper reaction force versus bumper displacement curve increases quickly during initial bumper displacement until a desired force level is reached and thereafter remains generally constant as further displacement is experienced. The present invention accomplishes this goal. If, for example, the force versus displacement curve for a bumper system were to increase more slowly, the bumper would necessarily deflect a considerably greater distance during an impact. It will be appreciated that the result would be that a longer vehicle would be required to accommodate this additional movement Additionally, it will be noted that the bumper system of the present invention does not require an shock absorbing mounting arrangement to secure it to the vehicle load bearing members. By providing a curved bumper member which is directly attached to these load bearing members, the members can be made to extend further forward than would otherwise be the case. This is advantageous in that the additional length of the load bearing members provides added vehicle protection.

Having described the invention in detail and by reference to the preferred embodiment thereof, it will be apparent that other modifications and variations are possible without departing from the scope of the invention defined in the appended claims.

What is claimed is:

1. A vehicle bumper system for protecting a vehicle, said vehicle including a pair of longitudinally extending load bearing members, comprising:
   a curved bumper member extending between the ends of said pair of longitudinally extending load bearing members,
   tension means extending between said ends of said pair of longitudinally extending load bearing members for opposing outwardly directed lateral forces which may be applied to said load bearing members, and
   means for pivotally connecting said curved bumper member and said tension means to said ends of said pair of longitudinally extending load bearing members at the same locations on said load bearing members, such that an impact force applied to said bumper member does not result in outwardly directed lateral forces being applied to said load bearing members, or such lateral forces are minimized.

2. The vehicle bumper system of claim 1 in which said curved bumper member and said tension means are formed as a single unit.

3. The vehicle bumper system of claim 2 in which said means for connecting said curved bumper member and said tension means directly to said pair of longitudinally extending load bearing members at the same locations on said load bearing members comprises a pair of connector members, each of which extends through one or more openings in said single unit, and in one of said pair of longitudinally extending load bearing members.

4. The vehicle bumper system of claim 1 in which said curved bumper member and said tension means are formed of metal.

5. The vehicle bumper system of claim 1 in which said bumper member and said tension means are formed of a structural composite material.

6. The vehicle bumper system of claim 1 in which curved bumper member and said tension means are formed as separate elements, each being connected separately to said ends of said pair of longitudinally extending load bearing members.

7. The vehicle bumper system of claim 6 in which said means for pivotally connecting said curved bumper member and said tension means to said pair of longitudinally extending load bearing members at the same locations on said ends of said load bearing members comprises a pair of connector members, each of which extends through openings in said curved bumper member, in said tension means, and in one of said pair of longitudinally extending load bearing members.

8. A vehicle bumper system for protecting a vehicle, said vehicle being of the type having a vehicle body and including a pair of longitudinally extending load bearing members terminating at their forward ends, comprising:
   a curved bumper member extending between said pair of longitudinally extending load bearing members,
   tension means extending between said pair of longitudinally extending load bearing members for opposing the application of outwardly directed lateral forces to said load bearing members, and
   means for connecting said curved bumper member and said tension means directly to said pair of longitudinally extending load bearing members at the same locations on said load bearing members, such that an impact force applied to said bumper member does not result in outwardly directed lateral forces being applied to said load bearing members, or such lateral forces are minimized.

9. The vehicle bumper system of claim 8 in which said curved bumper member and said tension means are formed as a single unit.

10. The vehicle bumper system of claim 9 in which said means for connecting said curved bumper member and said tension means directly to said pair of longitudinally extending load bearing members at the same locations on said load bearing members comprises a pair of connector members, each of which extends through one or more openings in said single unit, and in one of said pair of longitudinally extending load bearing members.

11. The vehicle bumper system of claim 8 in which said curved bumper member and said tension means are made of metal.

12. The vehicle bumper system of claim 8 in which said curved bumper member and said tension means are made of a structural composite material.

13. The vehicle bumper system of claim 8 in which curved bumper member and said tension means are formed as separate elements, each being connected to said pair of longitudinally extending load bearing members.

14. The vehicle bumper system of claim 13 in which said means for connecting said curved bumper member and said tension means directly to said pair of longitudinally extending load bearing members at the same locations on said load bearing members comprises a pair of connector members, each of which extends through openings in said curved bumper member, in said tension means, and in one of said pair of longitudinally extending load bearing members.

15. The vehicle bumper system of claim 8 in which said bumper member extends laterally outward beyond said longitudinally extending load bearing members within said vehicle body.

16. The vehicle bumper system of claim 15 further comprising energy absorbing means mounted on said bumper member adjacent the ends thereof, laterally outward of said longitudinally extending load bearing members, for absorbing the energy of an impact to said vehicle body.

17. The vehicle bumper system of claim 16 in which said energy absorbing means mounted on said bumper member adjacent the ends thereof comprise a pair of blocks of energy absorbing foam material attached to said bumper member.

* * * * *